(1) $E_2 = \frac{RE_3}{R+R_3} e^{-\frac{t_1}{RC}}$ (2) $E_0 = \frac{RE_1}{R+R_1} e^{-\frac{t_1}{RC}}$ (3) $E_0 = \frac{R+R_3}{R+R_1} \cdot \frac{E_1 E_2}{E_3}$ (4) $E_0 = K \cdot \frac{E_1 \cdot E_2^{\frac{R_1C_1}{R_2C_2}}}{E_3^{\frac{R_1C_1}{R_2C_2}}}$ INVENTOR.
OMAR L. PATTERSON
BY
Busser, Smith & Harding
ATTORNEYS INVENTOR.
OMAR L. PATTERSON
BY
Busser, Smith & Harding
ATTORNEYS Jan. 16, 1962 O. L. PATTERSON 3,017,106

COMPUTING CIRCUITS

Filed Jan. 13, 1954 5 Sheets-Sheet 3

(5) $$E_0 = \frac{b_1 b_2}{E_3+E_b} \cdot E_1 E_2$$

(6) $$E_1' = E_1 - \frac{E_b+K_1}{b_1}$$

(7) $$E_2' = E_2 - \frac{E_b+K_2}{b_2}$$

(8) $$E_0' = E_0 - E_b$$

*INVENTOR.*

OMAR L. PATTERSON

*BY*

Busser, Smith & Harding

ATTORNEYS $$E_0 = \frac{1}{K}(E_A + e_A)(E_B + e_B) \quad (9)$$

$$E_P = E_0 - \frac{1}{K}(E_A e_B + E_B e_A + e_A e_B) = \frac{E_A E_B}{K} \quad (10)$$

$$E_3 = E_1 f(E_X) \quad (11)$$

$$E_2 = E_0 f(E_X) \quad (12)$$

$$E_0 = \frac{E_1 E_2}{E_3} \quad (13)$$

INVENTOR.
OMAR L. PATTERSON
BY
Busser, Smith & Harding
ATTORNEYS

INVENTOR.
OMAR L. PATTERSON
BY
Busser, Smith & Harding
ATTORNEYS 3,017,106

COMPUTING CIRCUITS

Omar L. Patterson, Media, Pa., assignor to Sun Oil Company, Philadelphia, Pa., a corporation of New Jersey Filed Jan. 13, 1954, Ser. No. 403,799
12 Claims. (Cl. 235—194)

This invention relates to computing circuits and, particularly, to circuits for the performance of multiplication and/or division.

Since the process of multiplication is non-linear, it presents a very difficult problem in electrical computing apparatus where a high degree of accuracy and response time are required. Multiplication has been accomplished by electromechanical devices, carrier waveform systems, non-linear elements, multivariable tube characteristics, and various modulation systems. Electromechanical devices and carrier systems are capable of providing accuracies of the order of 0.1 percent but have poor response time. On the other hand, systems involving non-linear elements and characteristics are generally restricted to a range of 1 to 5 percent in accuracy but are capable of a high speed of response.

The present invention relates to circuits for the performance of multiplication and/or division which combine high accuracy and good frequency response. As will become clear hereafter, the invention relates to what might be referred to as parametric multiplication and division, involving the introduction of a dependent parameter which is mathematically eliminated from a pair of equations to secure multiplication and/or division.

The general object of the invention as well as detailed objects particularly relating to features of construction and operation will become apparent from the following description read in conjunction with the accompanying drawings, in which:

FIGURE 1 is a wiring diagram illustrating one embodiment of the invention utilized for the carrying out of multiplying or dividing computations;

FIGURE 2 comprises curves illustrating the operation of the circuit of FIGURE 1 and also embodies certain equations pertinent thereto;

Figure 5:
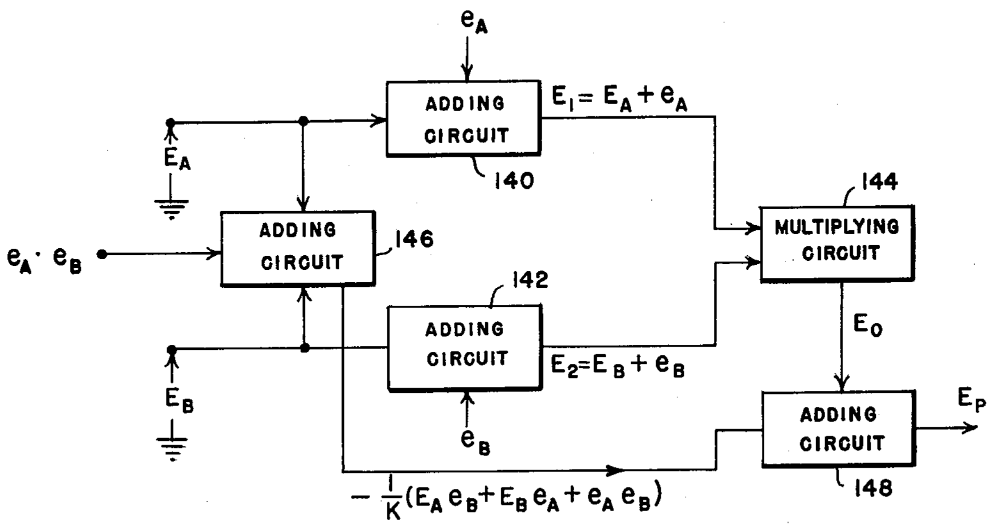
Figure 7:
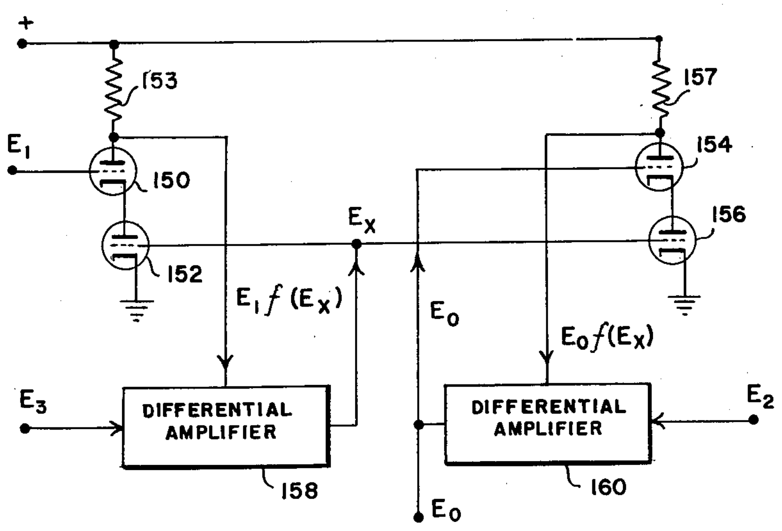
Figure 6:
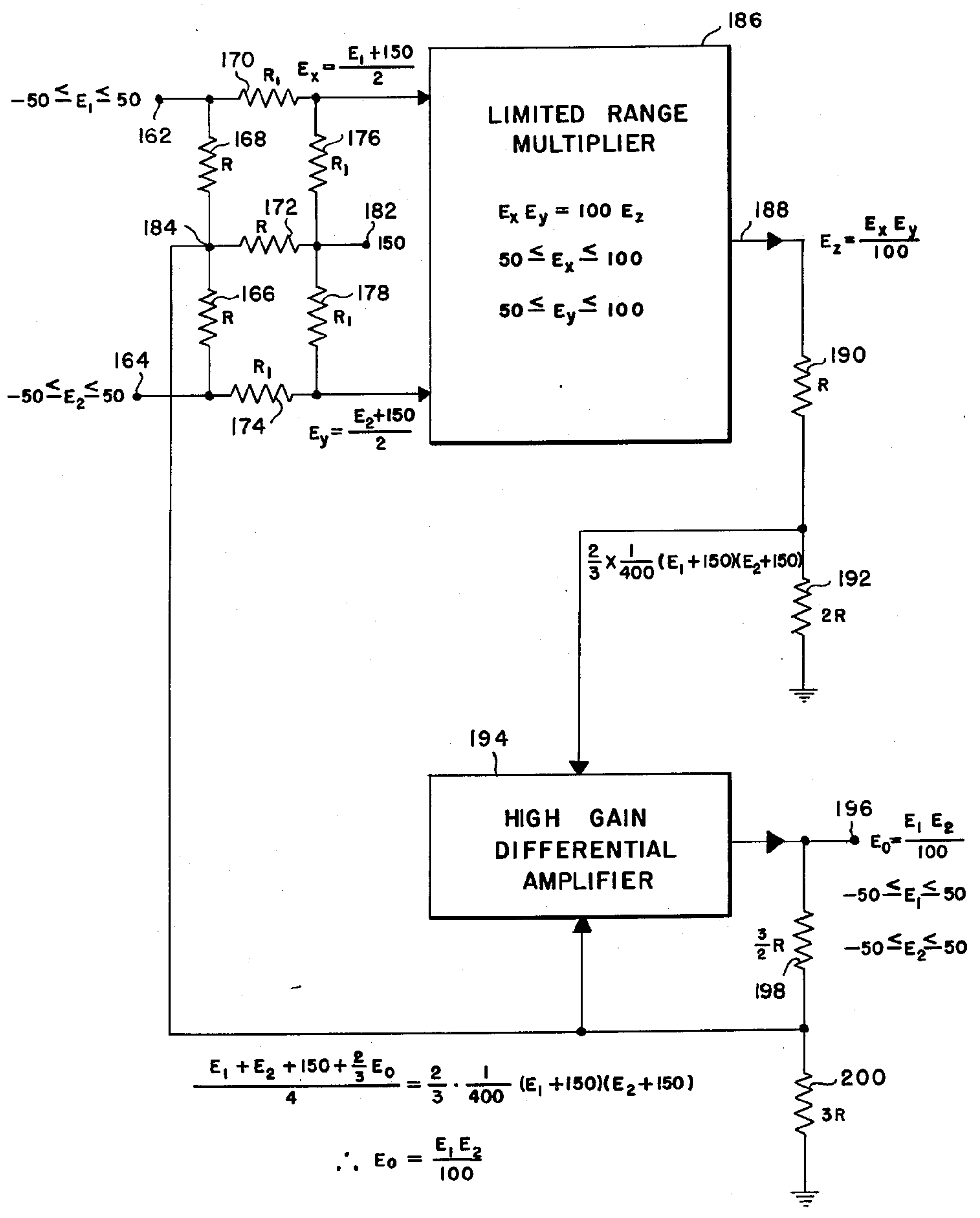

FIGURE 5 comprises a block diagram and various equations pertinent thereto, the diagram illustrating the fashion in which negative as well as positive quantities may be multiplied or divided;

FIGURE 6 is a diagram and various expressions pertinent thereto illustrating a further fashion in which negative as well as positive quantities may be multiplied; and FIGURE 7 is a wiring diagram showing still another modification in accordance with the invention and comprising equations explanatory of its operation.

The essential aspects of the present invention may be made clear by preliminary reference to the equations numbered (11), (12) and (13) of FIGURE 7, disregarding at the present time the relationship of these equations to the diagram in the same figure. Equation (11) expresses a quantity $E_3$ as a product of another quantity $E_1$ with a function the nature of which may, in accordance with the present invention, be quite general. Equation (12) expresses another quantity $E_2$ in terms of the product of a fourth quantity $E_0$ and the same function. The function is involved in these two equations as a parameter, and if it may be eliminated, Equation (13) results involving the expression of $E_0$ as the product of $E_1$ and $E_2$ divided by $E_3$. In accordance with the invention, apparatus is provided for the elimination of a functional parameter of the type just referred to with the resultant securing of an expression involving multiplication and/or division. For simplicity of description, the apparatus will be generally referred to hereafter as producing multiplication, but it will become evident, following the relationships of quantities indicated in Equation (12), that division may also be carried out and, in fact, a simultaneous combination of multiplication and division, if desired.

Figure 1:
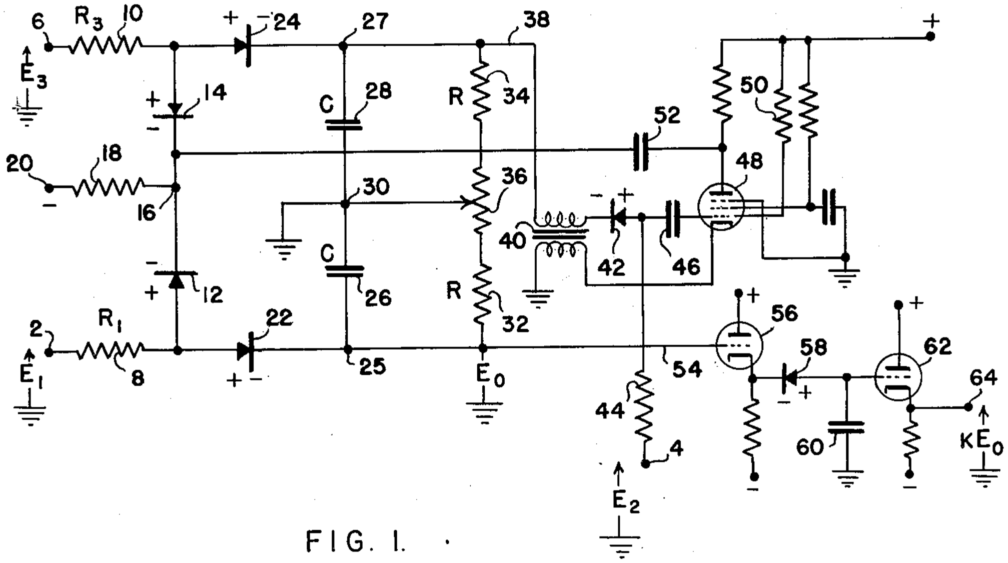

Reference may be made first to FIGURE 1 which shows a circuit capable of producing high accuracy results with rapid response. With a resolution time of ten microseconds an accuracy of about 1% may be obtained with this circuit while an accuracy of 0.1% may be obtained with a resolution of 100 microseconds.

Input potentials which are to be multiplied together and are indicated as $E_1$ and $E_2$ are applied, respectively, at terminals 2 and 4. A potential input $E_3$ is applied at terminal 6 and represents a quantity by which the product of $E_1$ and $E_2$ may be divided. In the case of multiplication alone, $E_3$ may be a constant and will appear as a constant of proportionality. On the other hand, if division is involved, $E_1$ or $E_2$ may be constant, and if merely a reciprocal of $E_3$ is desired, both may be constant. The particular fashion in which the potentials are applied may vary with the requirements. For high speed operation, low impedance sources are desirable and these may be provided through the use of cathode followers or other devices. The input signals themselves may have various origins, ranging from constant or slowly varying sources to sources involving rapid changes including, for example, the sampling of waveforms at particular instants as described in my application Serial No. 296,583, filed July 1, 1952, now Patent No. 2,728,037. As will appear from what follows, the computation is completed in the circuit in each of a number of repeated cycles of operation and it need only be assumed that the input potentials are constant over the duration of a single period. If the inputs are waveforms having a common cycle of repetition, which cycle has a period which is long in comparison with the cycles of the present circuit, the product and/or quotient may be emitted as a waveform having the same repetition cycle as the inputs. It will become apparent, however, that the computing circuit is of very wide applicability to numerous types of computers and will give an output corresponding to what may be regarded as a steady state existing only for the duration of one of the repetition cycles of the circuit.

The terminals 2 and 6 are respectively connected through resistances 8 and 10 to the anodes of a pair of diodes 12 and 14, the cathodes of which are joined at 16 and connected through resistance 18 to a constant negative potential terminal 20. The anodes of the diodes 12 and 14 are connected through diodes 22 and 24, having polarities as indicated, to the ungrounded terminals of a pair of condensers 26 and 28 which are grounded at 30. The ungrounded terminals designated 25 and 27 are connected to resistors 32 and 34 in series with which there is located a potentiometer 36 the contact of which is grounded. As will become apparent hereafter, accuracy of operation depends upon the identity of the time constants of the two RC circuits involving the condensers 26 and 28, the resistors 32 and 34, and the resistance of potentiometer 36. Designating the capacities of the condensers 26 and 28 as C, and the resistances between terminal 25 and the potentiometer contact, and between terminal 27 and the potentiometer contact as R, the product RC must be maintained constant. For this purpose, it is desirable that the two RC circuits should be located in close proximity in a common housing to minimize the effects of temperature variations, with the two circuits employing elements having identical temperature coefficients. Any residual differences may be cancelled out by adjustment of the contact of potentiometer 36 or by providing fine adjustment of the capacities of the condensers 26 and 28. It may be remarked, as will appear hereafter, that the low reverse conductances of the diodes may play a minor part in the operation and the adjustment of the potentiometer may take these into account. In any event, the two circuits may be adjusted to secure very accurate correspondence of the time constants.

Employed in the circuit is a simple and accurate amplitude comparison circuit which is known as a multiar circuit and is described on page 343 of volume 19, Waveforms, of the Radiation Laboratory Series. The terminal 27 is connected at 38 to the secondary of a transformer 40 and through it to the cathode of a diode 42 which is connected through condenser 46 to the grid of a pentode 48 constituting the multiar tube. The anode of diode 42 is connected through resistor 44 to the terminal 4. The connections of the multiar circuit are conventional and as indicated in the reference, these connections including the connection of the cathode of pentode 48 to ground through the primary of the transformer 40, and the connection of the control grid to the positive potential supply line through a high resistance 50.

The output from the anode of pentode 48 is connected through condenser 52 to the junction 16 of the cathodes of diodes 12 and 14.

The terminal 25 is connected to a demodulator which comprises the connection 54 to the grid of a triode 56 in a cathode follower arrangement returning to a fixed negative potential terminal. The cathode of triode 56 is connected to the cathode of a diode 58 the anode of which is connected to the ungrounded terminal of a condenser 60 and also to the grid of a triode 62 also arranged in a cathode follower circuit returned to the negative potential source. The output is taken from the cathode of triode 62 through terminal 64.

The diodes illustrated in the circuit may be either of vacuum or crystal type.

The operation may be best described by assuming, as will be justified later, that the multiar circuit has effected a charging of condensers 26 and 28 by the delivery of a positive pulse through condenser 52 and that the multiar pentode 48 is, at the beginning of operation, highly conducting, with the result that at terminal 16 there is no output from the multiar which disturbs the existence of a negative potential at the terminals 16 resulting from current flow from terminal 6 through resistor 10, diode 14 and resistor 18, and from terminal 2 through resistor 8, diode 12 and resistor 18. Under these conditions, the anodes of diodes 22 and 24 will be at negative potentials lower than any occurring during operation about to be described so that the diodes 22 and 24 are cut off. Prior to this, the multiar will have produced a positive pulse at terminal 16 sufficient to effect cut-off of the diodes 12 and 14 so that charging of condensers 26 and 28 will have taken place respectively through resistances 8 and 10, with the result that the respective condensers will have been charged to potentials given by the expressions at the upper portions of the curves (B) and (A) in FIGURE 2, respectively. The resistances of resistors 8 and 10 are designated $R_1$ and $R_3$, respectively. The time $t_0$ may be considered the instant at which, following the charging just referred to, the diodes 22 and 24 are cut off.

The condensers 26 and 28 now discharge through the resistors 32 and 34 exponentially in accordance with the right-hand expressions in Equations (1) and (2), $t$ being the variable. These discharges are indicated graphically in the curves (A) and (B). The discharge continues until the potential of condenser 28 at terminal 27 reaches the value $E_2$ introduced at terminal 4. At the instant this equality is reached, the diode 42 begins to conduct to start to drive the control grid of pentode 48 negative, this control grid having theretofore been connected to the positive potential supply line through resistor 50. The action is regenerative, through the feedback afforded through transformer 40, and the pentode 48 is sharply cut off. A steep positive pulse is thus delivered through condenser 52 to terminal 16, cutting off diodes 12 and 14 and thus rendering conductive diodes 22 and 24 to initiate recharging of the condensers 26 and 28. This action occurs at the instant $t_1$.

Figure 2:
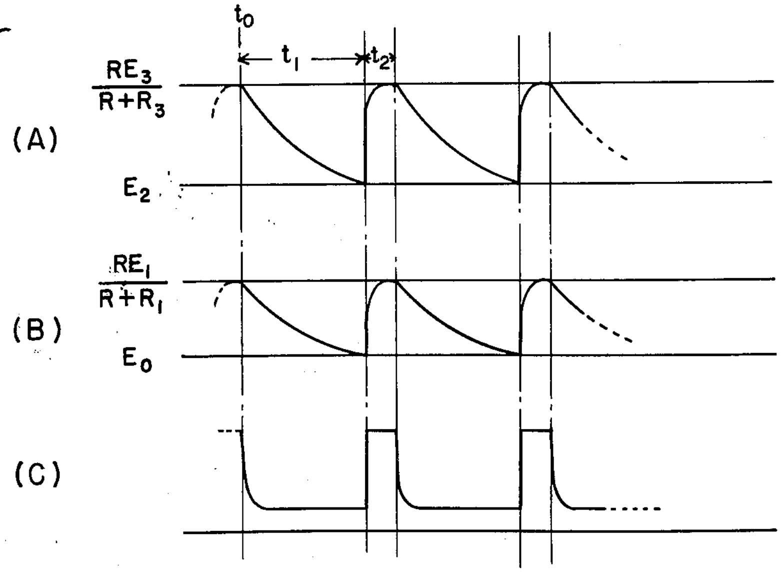

During the drop of potential of terminal 25 of condenser 26, the potential $E_0$ of this terminal follows the exponential law given in Equation (2) of FIGURE 2 until the time $t_1$ at which the pentode 48 is cut off. Noting that the exponential functions in Equations (1) and (2) both have the identical value, it follows that $E_0$ has at this instant the value given by the Equation (3), representing the product of $E_1$ by $E_2$ divided by $E_3$ and multiplied by a constant depending upon the resistances, which constant is unity if $R_1$ equals $R_3$. As pointed out above, the RC product must be the same for the two condenser discharge circuits, including the back resistance of the diodes. Adjustment for such constant value of the time constant is provided by the adjustment of potentiometer 36.

The potential $E_0$ at the grid of triode 56 gives a corresponding potential at its cathode and current flows through the diode 58 to bring the condenser 60 to a potential corresponding to the minimum value of $E_0$. This condenser, in turn, is connected to the grid of the cathode follower triode 62 and an output is delivered at terminal 64 which, as indicated, is proportional to $E_0$. In general, simple cathode followers are useable in this demodulating circuit but high accuracy may be secured by the use of more elaborate cathode follower circuits involving differential amplification and feedback.

The pentode 48 now remains cut off for a period $t_2$ indicated in FIGURE 2 which is determined by the grid time constant consisting of the product of the value of the capacity at 46 multiplied by the sum of the resistances at 50 and 44. This time constant is so chosen as to make $t_2$ more than sufficient to allow complete recharge of the condensers 26 and 28. Since the positive pulse resulting from cut off of pentode 48 rises very rapidly, as indicated in curve (C) of FIGURE 2, the condensers 26 and 28 start recharging almost immediately after the instant $t_1$. This cuts off conduction through diode 42 and because of this action the usual trouble of "bouncing" which is experienced with multiar circuits is not encountered. With the initiation of recharging, the diode 58 is cut off so that the condenser 60 retains the charge which it received during the condenser discharge previously described. The demodulator, therefore, acts as a negative peak voltmeter, and the condenser 60 will be fully charged in a single cycle if triode 56 is arranged so as to be heavily conductive. The multiar recovers in the usual fashion, with a drop of its anode potential to a low value characteristic of heavy conduction of the pentode. The recovery time of the multiar is the main limitation on the speed of response obtainable with this type circuit, since the minimum time $t_1$ required for the exponential drop of potentials of the condensers must be sufficiently long to allow sufficient time for recovery of the multiar circuit before the initiation of the next cycle. It will be evident from what has been described that the multiplication indicated in Equation 3 may be very accurately carried out in a very short period.

The simple demodulator circuit shown in FIGURE 1 will respond rapidly to decreasing values of $E_0$ only. If a high speed of response for variations of the input potentials is desired for both increasing and decreasing values of the product, then a more elaborate demodulating circuit is required such as the four diode demodulator which will be shortly described.

In the foregoing it has been assumed that the simple multiplication-division of Equation 3 was to be performed and there was accordingly stressed the maintenance of equality of the time constants of the two condenser discharge circuits. However, if the time constants are unequal a more general result may be secured as expressed by Equation 4 in which K is a constant, $R_1C_1$ is the time constant of the circuit of condenser 28, and $R_2C_2$ is the time constant of the circuit of condenser 26. As will be evident from this equation powers of inputs other than unity may be involved and, specifically, by equating of $E_1$ with either $E_2$ or $E_3$ (the other being constant), $E_0$ will appear as any of a wide range of powers of $E_1$. If $E_1$ is a function of time slowly varying with respect to the periods of the repetition cycle a power function may be developed as a step function smoothable by filtering. Power functions may be thus far more accurately produced than by hitherto known methods.

Figure 3:
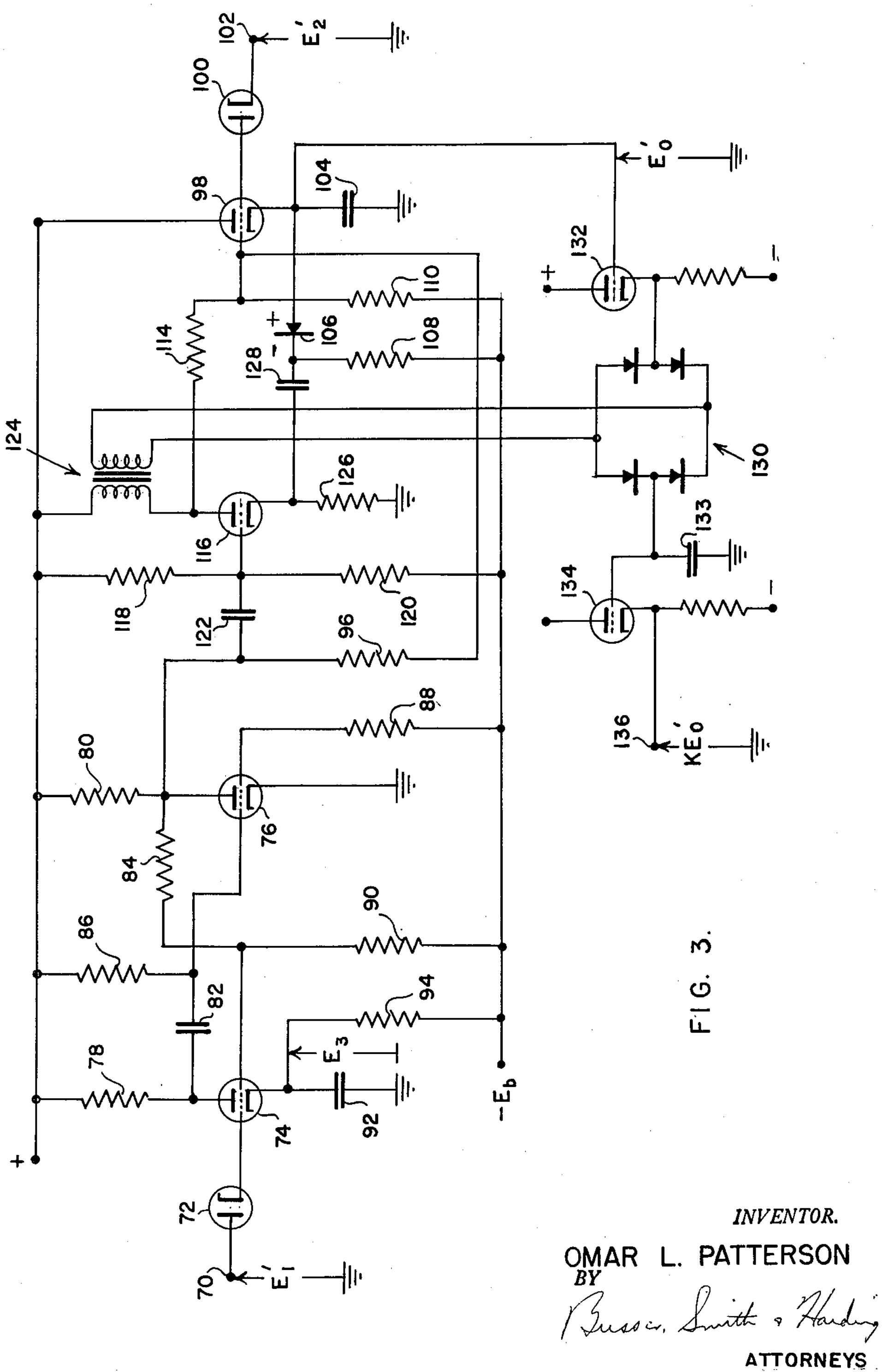
FIGURE 3 is a wiring diagram showing another embodiment of the invention.

Reference may now be made to FIGURE 3 which shows another parametric time multiplying circuit in the form of a self-triggering multivibrator. This circuit provides higher input impedance than the circuit of FIGURE 1 but is subject to drift of vacuum tube cut-off voltages.

An input terminal 70 has applied thereto a potential $E_1'$ the nature of which will be hereafter described. The terminal 70 is connected to the anode of a diode 72 the cathode of which is connected to the grid of a triode 74 which is associated with a second triode 76 in a monostable multivibrator circuit involving the connections of the anodes of triodes 74 and 76 to a positive potential supply line through the respective resistances 78 and 80, the connection of the anode of triode 74 to the grid of triode 76 through the condenser 82, the connection of the anode of triode 76 to the grid of triode 74 through resistor 84, the connection of the grid of triode 76 to the positive potential supply line through resistor 86, and the connection of the grids of the triodes 76 and 74 to a negative potential supply line through the respective resistors 88 and 90. The potential of this negative supply line is indicated as $-E_b$. The cathode of triode 74 is connected to ground through condenser 92 and to the negative potential supply line through resistor 94.

The anode of triode 76 is connected through resistor 96 to the grid of a triode 98 which is also connected through the diode 100 to the terminal 102 at which there is applied the potential $E_2'$, the terminal 102 being connected to the cathode of the diode 100. A condenser 104 connects the cathode of triode 98 to ground. The cathode of triode 98 is connected through diode 106 and resistor 108 to the negative potential supply line. The anode of diode 106 is connected to the cathode of triode 98. The junction of the cathode of diode 106 and the resistor 108 is connected through condenser 128 to the cathode of a triode 116, the grid of which is connected to the positive potential supply line through resistor 118 and to the negative potential supply line through resistor 120. The anode of triode 76 is connected to the grid of triode 116 through condenser 122. The anode of triode 116 is connected to the positive potential supply line through the primary of a transformer 124. The cathode of triode 116 is connected to ground through resistor 126. The secondary of the transformer 124 is connected to the four diode switch as indicated at 130, this switch being connected at one side to the cathode of triode 132 in a cathode follower arrangement, the grid of the triode 132 being connected to the cathode of triode 98. The other side of the switch is connected to the grid of a triode 134 which is in a cathode follower arrangement with an output from its cathode to the output terminal 136 at which there appears the potential $E_0'$.

Triode 76 is normally highly conducting due to a positive potential of its grid from the arrangement of resistors 86 and 88, but it may be assumed in describing the beginning of the operation that triode 76 has been cut off, with triode 74 highly conducting due to the high potential at the anode of triode 76 and the arrangement of resistors 80, 84 and 90. Under these conditions, the condenser 92 is charged to an initial maximum potential equal to that of the grid of triode 94 plus the bias potential between the cathode and grid. This fully charged potential of condenser 92 will be referred to as $E_3$. The diode 72 will be cut off because the potential $E_3$ is in excess of the potential $E_1'$.

The high positive potential of the anode of triode 76 at cut-off is applied through resistor 96 to the grid of triode 98 but limited to $E_2'$ by the diode 100. Accordingly, the condenser 104 is charged to a potential which is $E_2'$ plus the bias voltage of this triode plus the contact potential drop through diode 100. The initial potentials of the condensers 92 and 104 are, accordingly, established.

Following the full charge of condenser 92 (and, simultaneously, condenser 104), the current through resistor 78 reaches a minimum value, cathode current flowing through resistor 94 only, and the condenser 82 charges through resistor 86 to a point at which triode 76 starts to conduct whereupon there occurs the usual regenerative action of a monostable multivibrator, triode 74 being sharply cut off and triode 76 being quickly rendered highly conductive. The drop of potential at the anode of triode 76 is applied to the grid of triode 98 which is also cut off.

Considering these last mentioned events as establishing zero time, the charged condensers 92 and 104 are both isolated from their charging circuits so that exponential decay of their potentials occurs in the same fashion as in the first modification described. The time constant of the circuit of condenser 92 is the product of the resistance of resistor 94 and the capacity of condenser 92. The time constant of the circuit of condenser 104 is the product of the sum of the forward resistance of diode 106 and the resistance of resistor 108 multiplied by the capacity of condenser 104. (As will shortly appear, the cathode of triode 116 is now positive and quiescent so that the presence of condenser 128 does not enter into the matter of the time constant.)

Discharge of condenser 92 continues until the potential of its cathode drops sufficiently to restore conduction of triode 74. This condition occurs when the cathode potential drops to a point such that the grid is above cut-off potential relative to the cathode, the grid potential being maintained by the connection to terminal 70 through diode 72. Assume that this condition occurs at time $t_1$ indicated in FIGURE 4. At this same time, the potential of condenser 104 will have dropped to some value $E_0'$. The two exponential factors in the expressions for the potentials of condensers 92 and 104 are equal, giving rise to the elimination of the parametric exponential term and a product relationship which will be more fully discussed later.

Figure 4:
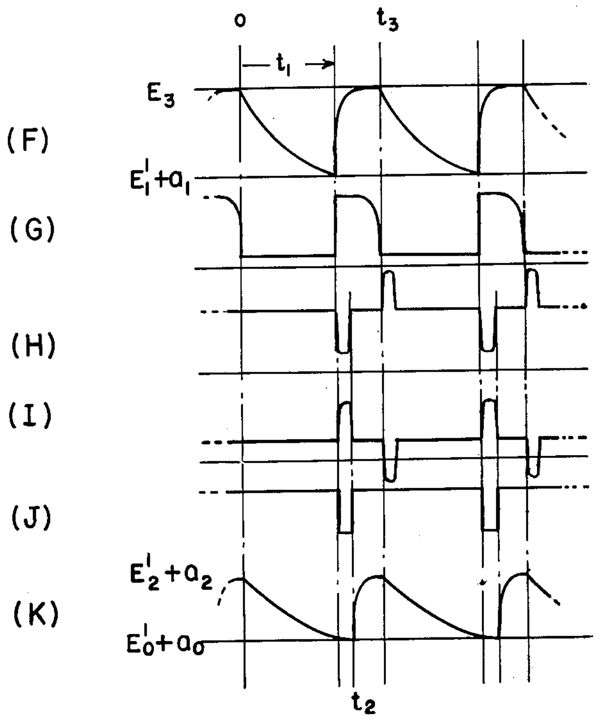
FIGURE 4 is a view similar to FIGURE 2 but explanatory of the operation of the circuit of FIGURE 3.

As indicated at (F) in FIGURE 4, the potential of condenser 92 will thus have dropped from the value $E_3$ to a value $E_1'$ plus $a_1$ in which $a_1$ merely represents a small potential. Similarly, as indicated at (K) in FIGURE 4, the potential of condenser 104 will have dropped from $E_2'$ plus $a_2$ to a value $E_0'$ plus $a_0$, in which $a_2$ and $a_0$ are also small constants.

Continuing the description of the operation, the initiation of current flow through triode 74 produces a negative application of potential through condenser 82 to the grid of triode 76 and a regenerative action occurs leading to sharp cut-off of triode 76 as indicated by the sharp rise in curve (G) in FIGURE 4 representing the potential at the anode of triode 76. This sharp rise of anode potential is differentiated by the arrangement of condenser 122 and resistors 118 and 120 and is applied as a positive pulse to the grid of triode 116 which is rendered highly conductive with the resulting appearance of a positive pulse at its cathode and a negative pulse at its anode. These pulses are indicated, respectively, at (I) and (H) in FIGURE 4. The positive pulse at the cathode cuts off diode 106 and, accordingly, terminates the discharge of condenser 104 at time $t_1$ as already indicated. The condenser 104, therefore, retains its potential $E_0'$ for the duration of the pulse, as indicated by the horizontal line at (K) of FIGURE 4, terminating at the time $t_2$. At the same time, the negative pulse at the anode of triode 116 insures cut-off of triode 98 despite the rise of potential at the anode of triode 76 which in the absence of the pulse from triode 116 would have rendered the triode 98 conductive. The potential of the condenser 104 is, accordingly, maintained constant during the interval between $t_1$ and $t_2$. Its potential is applied to the cathode follower involving the triode 132. Prior to time $t_1$ the four diode switch 130 was non-conducting due to the positive wave at the primary of transformer 124. At time $t_1$ the negative pulse at the anode of triode 116 produces a corresponding high amplitude pulse at the switch rendering it conductive and thereby connecting the cathode of triode 132 to the condenser 133 and the grid of triode 134. The condenser 133 is thus charged to the potential of the cathode of triode 132, current flow taking place in either direction through the switch to secure equality of these potentials.

The differentiated pulse appearing at the grid of triode 116 is of short duration, terminating at time $t_2$, and at this latter time the triode 116 again becomes non-conductive, removing the actuating pulse from the diode switch and isolating condenser 133 from the cathode of triode 132. The condenser 133 then holds the potential applied thereto and a proportional potential appears at the output terminal 136, this potential, as indicated in FIGURE 3, being proportional to the potential $E_0'$.

The resumption of cut-off condition of triode 116 restores the positive condition of its anode and the negative condition of its cathode. Diode 106, accordingly, is again rendered conductive (though this condition is of unimportance at this particular time), while triode 98 is rendered conductive, now under control of the continuing positive pulse at the anode of triode 76. At time $t_2$, therefore, recharging of condenser 104 occurs to the potential previously indicated related to the potential $E_2'$ at terminal 102. In the meanwhile, since time $t_1$, condenser 92 was charging. Circuit constants are so chosen that the condenser 104 will be fully charged before condenser 92, so that at time $t_3$ when the multivibrator returns to its stable state the circuit is restored to proper condition for a repetition of the cycle.

Differing from the situation presented in the circuit of FIGURE 1, the multiplication effected by the circuit of FIGURE 3 does not involve direct multiplication of potentials appearing at terminals 70 and 102. There are several reasons for this. First, it may be noted that the condensers 92 and 104, if fully discharged, would have at their ungrounded terminals the potential $-E_b$. The return of the circuit to this negative potential line is chosen to avoid troubles in handling zero inputs. Such inputs pose a problem since exponential discharge would involve an infinite length of time for discharge to occur to zero. Furthermore, a return to the negative potential insures a high degree of linearity between the potentials of the cathodes of triodes 74 and 98 and the potentials of their respective grids. Secondly, there are involved cut-off and contact potentials in the triodes 74 and 98 and in the diodes 72 and 100. A complete analysis, which need not be undertaken here, reveals the following:

Assuming that it is desired to secure as $E_0$ the product of a pair of quantities (potentials) $E_1$ and $E_2$ as indicated in Equation (5) in FIGURE 4, the fraction being a constant, the potentials applied at $E_1'$ and $E_2'$ must be related to $E_1$ and $E_2$, respectively, as indicated in equations (6) and (7). It will be noted that the applied and desired multiplied potentials are linearly related with additions of constants which involve the potential $E_b$ and constants designated $k_1$, $k_2$, $b_1$ and $b_2$. These latter constants embody tube characteristics, in particular cut-off and contact potentials, and, subject to drift, may be regarded as constants of the circuit to be determined by test multiplications. These constants may be added to $E_1$ and $E_2$ by conventional potentiometer and resistance arrangements of elementary type which need not be described. With the potentials $E_1'$ and $E_2'$ so arrived at applied to the terminals 70 and 102, there will be obtained the output at 136 proportional to $E_0'$ from which the value of the product $E_0$ may be derived by the addition of $E_b$ as indicated in Equation (8). There is thus obtained the desired product $E_0$ involving the proportionality constant which, as indicated in Equation (5), involves $b_1$, $b_2$, $E_3$ and $E_b$.

While $E_3$ has been indicated as resulting in the circuit of FIGURE 3 from the potential of the grid of triode 74 arising from the resistor arrangement 80, 84 and 90, it will be evident that $E_3$ may be arrived at independently by limiting the potential applied as a maximum to condenser 92, for example by connection of the cathode of triode 74 to a potential supply terminal through a diode having its positive terminal connected to the cathode of triode 74. Thus, division may be accomplished by a quantity which corresponds to the sum of $E_3$ and $E_b$. The circuit is, therefore, capable of the same uses as that of FIGURE 1 with the same possibility of generalization as described above for the involvement of various powers of the terms by the choice of different time constants for the condenser circuits.

The circuit of FIGURE 3 is particularly desirable because the maximum and minimum duration of the exponential discharge can be quite arbitrarily determined to provide the desired frequency response by suitable selection of circuit values and negative supply potential. For a given required accuracy, the upper limit of frequency response is determined by the rise and decay times of the positive pulse at the anode of triode 76. For a high speed of response, this triode may desirably be replaced by a pentode, the connections of which are conventional and obvious. Accuracy is primarily only affected by drift, which may be compensated by recalibration from time to time, and non-linearity between the grid and cathode of each of the triodes 74 and 98. However, these matters may be readily compensated for, and high accuracy with high speed of response is, therefore, readily attainable.

The use of the four diode switch at 130 permits rapid variation for both increasing and decreasing values of $E_0'$. It will be evident that a similar switch may be applied to the circuit of FIGURE 1 in place of the simple demodulator there shown.

The circuits of FIGURES 1 and 3 involve the same limitation as other known multiplying circuits of being unable to multiply directly negative quantities to give proper signs of outputs. However, this difficulty is readily overcome in accordance with what is diagrammed in FIGURE 5, involving association with the multiplying circuit of various adding circuits.

Assuming that it is desired to multiply quantities represented by potentials $E_A$ and $E_B$ which may have either positive or negative values, with the result of securing properly signed products, the potential $E_A$ is added in a conventional adding circuit 140 to a fixed positive potential $e_A$ which is of such magnitude that the sum will always be positive. The potential $E_B$ is likewise added in a circuit 142 to a fixed potential $e_B$ having the same property of producing a sum output which will always be positive. These two positive quantities are then introduced into the multiplying circuit 144 which may be of either of the types shown in FIGURES 1 and 3 or, in fact, of many other types. The product $E_0$ from the multiplying circuit will then have the form indicated in Equation (9) in which K is a constant. A further adding circuit 146 is provided which not only has the inputs $E_A$ and $E_B$ but an input corresponding to the product of $e_A$ and $e_B$. It should be noted that these last quantities are constants and, accordingly, this last introduction amounts only to the introduction of a fixed potential. In the adding circuit 146, by means of suitable resistances and potentiometers, the inputs are added to provide an output which is indicated in the diagram. It should here again be noted that $e_A$ and $e_B$ are merely constants and, therefore, represent mere proportions of the inputs $E_A$ and $E_B$. The output from the adding circuit 146 is fed to an adding circuit 148 where it is added to $E_0$ from the output of the multiplying circuit. The output of circuit 148 designated $E_P$ is as given in Equation (10) from which it will be noted that it is proportional to the product of $E_A$ and $E_B$. The adding circuits may be of any well-known types, the term "adding" being here used to include subtraction. For example, highly precise circuits of this type are disclosed in my application Serial No. 239,279, filed July 30, 1951, now Patent No. 2,855,145. It will be evident that following this procedure the multiplication of negative quantities will result in products of proper sign.

Another circuit for extending the range of multiplication to that of negative quantities is illustrated in FIGURE 6 and involves the use of a high gain differential amplifier. In explanation of the operation there are indicated in FIGURE 6 potentials appearing at various points of the circuit, and for purposes of illustration it is assumed that the input potentials to be multiplied vary from minus 50 volts to plus 50 volts, the numerical values of potentials being given consistent with such range of operation.

The potentials to be multiplied are $E_1$ and $E_2$ applied to the respective terminals 162 and 164. These terminals are connected to an array of resistors 166, 168, 170, 172, 174, 176 and 178. The junction of resistors 176 and 178 is connected to a terminal 182 to which there is applied 150 volts. A limited range multiplier, i.e., one which will operate only on positive input potentials, is indicated at 186 and may be of any of the types previously described or other conventional types. Its inputs are provided, respectively, from the junction of resistors 170 and 176 and from the junction of resistors 174 and 178. Its output is delivered at 188 to the series arrangement of resistors 190 and 192 running to ground. A high gain differential amplifier has one input provided from the junction of resistors 190 and 192, and its other input from the terminal 184 at the junction of resistors 166 and 168. The output of the differential amplifier is to a terminal 196 and to the series arrangement of resistors 198 and 200 running to ground. The junction of these last resistors is connected to the same input as the terminal 184.

It will be noted that certain of the resistors mentioned have the same value R, while resistor 192 has a value 2R, resistor 198 has a value three-halves R and resistor 200 has a value 3R. Resistors 170, 176, 178 and 174 have equal values $R_1$ which need not be related to R.

By following the voltage legends at the various terminals and connections, the operation of the circuit will be apparent. At terminals 162 and 164 the applied potentials $E_1$ and $E_2$ may vary both positively and negatively. Through the introduction of the positive 150 volt potential at terminal 182, the inputs to the multiplier are made essentially positive. The output of the multiplier is also essentially positive. The high gain differential amplifier receives only positive potentials, but, since it operates between a high positive potential and a high negative potential, its output may be either positive or negative within the limits of operation. It will be noted that a scale factor of 100 is introduced in the value of the output potential $E_0$ so that the differential amplifier output varies within reasonable limits even though both of the inputs may be 50 volts.

The detailed description of multiplying circuits heretofore given has involved the introduction of parameters having time as the independent variable. As noted in the introduction, however, the invention is not limited to the elimination of parameters dependent on time. FIGURE 7 illustrates how the invention may be applied to the use of parameters which are not dependent on time.

In FIGURE 7 cascoded arrangements of triodes are indicated, one of these comprising the triodes 150 and 152 and the other the triodes 154 and 156, the two arrangements being assumed identical, a condition which may be closely approximated by choice of individual tubes. These arrangements are mere y typical of numerous ones which may be adopted and merely represent arrangements having the following properties:

Considering the arrangement of triodes 150 and 152, the property is that with inputs $E_1$ and $E_x$ applied to the respective grids of triodes 150 and 152 there be obtained a product of $E_1$ by a function of $E_x$. This cascoded arrangement of triodes is described on page 670 of Waveforms, volume 19, Radiation Laboratory Series, wherein it is stated that the anode current is proportional to the product of the two grid inputs, so that the potential at the junction of the anode of triode 150 and the load resistor 153 is also proportional to this product. However, this is only an approximation; and the arrangement merely gives a rough approximation to the product. It would be more accurate to state that the output corresponds to what is indicated in Equation (11). The circuit has the advantage, however, that with careful choice of tubes two such arrangements may be provided to give very closely corresponding functional outputs.

The output from the junction of the anode of triode 150 and load resistor 153 is fed to a differential amplifier 158 the second input of which is a potential $E_3$. The output of this differential amplifier, $E_X$, is fed to the grid of triode 152. The result is the maintenance of the equality indicated at (11) in FIGURE 7, this equality being maintained to a high degree of accuracy if there is used a differential amplifier of the type described in my said application.

The output from the junction of the anode of triode 154 with load resistor 157 is fed to a second differential amplifier 160 of the same type which has a second input indicated as the potential $E_2$. The output of this differential amplifier 160 is fed to the grid of triode 154 while the triode 156 receives at its grid the output from the differential amplifier 158. The result of the operation of the differential amplifier 160 is to maintain to a high degree of accuracy the equality indicated at (12). The quantity $E_X$ appearing in both Equations (11) and (12) being the same, and the form of the function being the same as obtained from a proper choice of the tubes involved, it is evident that the output $E_0$ of the differential amplifier 160 will be as indicated in Equation (13), namely, equal to the product of $E_1$ by $E_2$ divided by $E_3$. Thus, the elimination of the functional parameter gives rise to a product just as in the case of the circuits of FIGURES 1 and 3 which involve time as an independent variable. The circuit of FIGURE 7 gives a highly accurate value of the product so long as the functional relationships involved in the two arranegments are the same. Such corresponding relationships may be secured with other arrangements of tubes and it will be understood, therefore, that the cascoded arrangements illustrated are merely to be considered as typical and have been described merely because the functional forms of the outputs may be made very closely identical. Multiplication may be secured in accordance with FIGURE 7 to a very high degree of accuracy with very high speed of response.

What is claimed is:

1. Apparatus of the type described comprising means providing a first output in the form of a product of a first quantity with a predetermined function of a variable parameter, a first differential amplifier receiving inputs of said first output and of a second quantity and providing said variable parameter as an output to maintain said inputs substantially equal, means receiving said variable parameter output and a third quantity and providing a second output in the form of a product of said third quantity with a predetermined function of said variable parameter, and a second differential amplifier receiving inputs of a fourth quantity and of said second output and providing an output of said third quantity, thereby providing said third quantity as a function of said other quantities by elimination of said variable parameter.

2. Apparatus of the type described comprising means providing a first output in the form of a product of a first quantity with a predetermined function of a variable parameter, a first differential amplifier receiving inputs of said first output and of a second quantity and providing said variable parameter as an output to maintain said inputs substantially equal, means receiving said variable parameter output and a third quantity and providing a second output in the form of a product of said third quantity with substantially the same predetermined function of said variable parameter, and a second differential amplifier receiving inputs of a fourth quantiay and of said second output and providing an output of said third quantity, thereby providing said third quantity as a function of said other quantities by elimination of said variable parameter.

3. Apparatus of the type described comprising an electronic multiplying circuit of the type capable of effecting multiplication only of inputs of the same sign, means for adding quantities to inputs to be multiplied to provide inputs of the same sign to said multiplying circuit, and means for modifying the output of said multiplying circuit to provide an output corresponding to the signed product of said inputs to be multiplied.

4. Apparatus of the type described comprising an electronic multiplying circuit of the type capable of effecting multiplication only of inputs of the same sign, means for adding quantities to inputs to be multiplied to provide inputs of the same sign to said multiplying circuit, and means receiving a function of said inputs to be multiplied for modifying the output of said multiplying circuit to provide an output corresponding to the signed product of said inputs to be multiplied.

5. Apparatus of the type described comprising an electronic multiplying circuit of the type capable of effecting multiplication only of input potentials of the same sign, means for adding potentials to input potentials to be multiplied to provide input potentials of the same sign to said multiplying circuit, and means for modifying the output of said multiplying circuit to provide an output corresponding to the signed product of said inputs to be multiplied.

6. Apparatus of the type described comprising an electronic multiplying circuit of the type capable of effecting multiplication only of input potentials of the same sign, means for adding potentials to input potentials to be multiplied to provide input potentials of the same sign to said multiplying circuit, and means receiving a potential which is a function of said inputs to be multiplied for modifying the output of said multiplying circuit to provide an output corresponding to the signed product of said inputs to be multiplied.

7. Apparatus of the type described comprising means receiving an electrical input signal corresponding to a first quantity and an electrical input signal corresponding to a variable parameter and providing a first output in the form of a product of said first quantity with a predetermined function of said variable parameter, means receiving an electrical input signal corresponding to a second quantity and an electrical input signal corresponding to said variable parameter and providing a second output in the form of a product of said second quantity with a predetermined function of said variable parameter, means maintaining said first output at a value corresponding to a third quantity, thereby controlling said variable parameter, and interconnections between said means providing an output corresponding to mathematical elimination of said variable parameter from said first and second outputs.

8. Apparatus of the type described comprising means receiving an electrical input signal corresponding to a first quantity and an electrical input signal corresponding to a variable parameter and providing a first output in the form of a product of said first quantity with a predetermined function of said variable parameter, means receiving an electrical input signal corresponding to a second quantity and an electrical input signal corresponding to said variable parameter and providing a second output in the form of a product of said second quantity with substantially the same predetermined function of said variable parameter, means maintaining said first output at a value corresponding to a third quantity, thereby controlling said variable parameter, and interconnections between said means providing an output corresponding to mathematical elimination of said variable parameter from said first and second outputs.

9. Appparatus of the type described comprising means receiving an electrical input signal corresponding to a first quantity and an electrical input signal corresponding to a variable parameter and providing a first output in the form of a product of said first quantity with a predetermined function of said variable parameter, means receiving an electrical input signal corresponding to a second quantity and an electrical input signal corresponding to said variable parameter and providing a second output in the form of a product of said second quantity with a predetermined function of said variable parameter, means maintaining said first output at a value corresponding to a third quantity and thereby controlling said variable parameter, and means maintaining said second output at a value corresponding to a fourth quantity and thereby controlling said electrical input signal corresponding to said second quantity, thereby providing said second quantity as a function of said other quantities by elimination of said variable parameter.

10. Apparatus of the type described comprising means receiving an electrical input signal corresponding to a first quantity and an electrical input signal corresponding to a variable parameter and providing a first output in the form of a product of said first quantity with a predetermined function of said variable parameter, means receiving an electrical input signal corresponding to a second quantity and an electrical input signal corresponding to said variable parameter and providing a second output in the form of a product of said second quantity with substantially the same predetermined function of said variable parameter, means maintaining said first output at a value corresponding to a third quantity and thereby controlling said variable parameter, and means maintaining said second output at a value corresponding to a fourth quantity and thereby controlling said electrical input signal corresponding to said second quantity, thereby providing said second quantity as a function of said other quantities by elimination of said variable parameter.

11. Apparatus of the type described comprising an electronic multiplying circuit of the type capable of effecting multiplication only of inputs of the same sign, means for adding quantities to inputs to be multiplied to provide inputs of the same sign to said multiplying circuit, a differential amplifier having a pair of input terminals and an output terminal, means providing to one of said input terminals the output of said multiplying circuit, and means receiving said inputs to be multiplied, said added quantities and the signal appearing at said output terminal and providing to the other of said input terminals a linear function of the inputs to be multiplied and said added quantities and the signal appearing at said output terminal to provide at said output terminal a function solely of said inputs to be multiplied.

12. Apparatus according to claim 11 in which the last mentioned means comprises a resistance network for proportioning the contents of said linear function.

References Cited in the file of this patent

UNITED STATES PATENTS

| | | |
|---|---|---|
| 2,415,190 | Rajchman | Feb. 4, 1947 |
| 2,415,191 | Rajchman | Feb. 4, 1947 |
| 2,582,018 | El Said | Jan. 8, 1952 |

OTHER REFERENCES

Waveforms (Chance et al.), 1949, pages 668–670.

The University of Connecticut Engineering Experiment Station, "Some Electronic Analogue Computer Techniques" (Robb et al.), Jan. 1953, pgs. 14–16.

Electronic Instruments (Greenwood et al.), 1948, pages 50–53.

Project Cyclone Symposium II on Simulation and Computing Techniques, Part 2 (McCool), 1952, pgs. 227–232 and 234–237.

Project Cyclone Symposium II on Simulation and Computing Techniques, May 1952, pages 225, 226 and 233.

Electronic Analog Computers (Korn & Korn), 1952, page 222.

"Proceedings of The IRE" (Broomall et al.), May 1952, pgs. 568–572.

El-Said, M.A.H. "Novel Multiplying Circuits with Application to Electronic Wattmeters," Proceeding of the I.R.E., vol. 37, No. 9, Sept. 1949, pages 1003–1015.

Chance et al.: "Waveforms," vol. 19, Radiation Laboratory Series, McGraw-Hill, 1949, Fig. 19.3(b).